(12) United States Patent
Arnitz et al.

(10) Patent No.: US 11,789,200 B2
(45) Date of Patent: *Oct. 17, 2023

(54) ARTIFICIALLY-STRUCTURED MATERIALS WITH SMART ELEMENTS

(71) Applicant: Elwha LLC, Bellevue, WA (US)

(72) Inventors: Daniel Arnitz, Seattle, WA (US); Patrick Bowen, Durham, NC (US); Seyedmohammadreza Faghih Imani, Durham, NC (US); Joseph Hagerty, Seattle, WA (US); Roderick A. Hyde, Redmond, WA (US); Edward K. Y. Jung, Las Vegas, NV (US); Guy S. Lipworth, Seattle, WA (US); Nathan P. Myhrvold, Bellevue, WA (US); David R. Smith, Durham, NC (US); Clarence T. Tegreene, Mercer Island, WA (US); Yaroslav A. Urzhumov, Bellevue, WA (US); Lowell L. Wood, Jr., Bellevue, WA (US)

(73) Assignee: Elwah LLC, Bellevue, WA (US)

( * ) Notice: Subject to any disclaimer, the term of this patent is extended or adjusted under 35 U.S.C. 154(b) by 503 days.

This patent is subject to a terminal disclaimer.

(21) Appl. No.: 17/035,294

(22) Filed: Sep. 28, 2020

(65) Prior Publication Data

US 2021/0018680 A1      Jan. 21, 2021

Related U.S. Application Data

(63) Continuation of application No. 15/839,330, filed on Dec. 12, 2017, now Pat. No. 10,788,624.

(Continued)

(51) Int. Cl.
*H01Q 15/00* (2006.01)
*H01Q 15/08* (2006.01)
(Continued)

(52) U.S. Cl.
CPC .......... *G02B 6/1225* (2013.01); *G02B 1/002* (2013.01); *G02B 1/007* (2013.01); *G02B 3/0037* (2013.01);
(Continued)

(58) Field of Classification Search
CPC ..... H01Q 15/0086; H01Q 15/02; H01Q 15/08
See application file for complete search history.

(56) References Cited

U.S. PATENT DOCUMENTS 7,525,711 B1 *   4/2009   Rule ...................... B82Y 20/00
                                                          359/321
7,830,618 B1    11/2010   Bowers et al.
(Continued)

*Primary Examiner* — Andrea Lindgren Baltzell
*Assistant Examiner* — Alan Wong

(57) ABSTRACT

According to various embodiments, an array of elements forms an artificially-structured material. The artificially-structured material can also include an array of tuning mechanisms included as part of the array of elements that are configured to change material properties of the artificially-structured material on a per-element basis. The tuning mechanisms can change the material properties of the artificially-structured material by changing operational properties of the elements in the array of elements on a per-element basis based on one or a combination of stimuli detected by sensors included in the array of tuning mechanisms, programmable circuit modules included as part of the array of tuning mechanisms, data stored at individual data stores included as part of the array of tuning mechanisms, and communications transmitted through interconnects included as part of the array of elements.

43 Claims, 8 Drawing Sheets

Related U.S. Application Data

(60) Provisional application No. 62/588,793, filed on Nov. 20, 2017.

(51) Int. Cl.

| | | |
|---|---|---|
| *G02B 6/122* | (2006.01) | |
| *G02B 1/00* | (2006.01) | |
| *G02B 3/00* | (2006.01) | |
| *G02B 6/02* | (2006.01) | |
| *F21V 8/00* | (2006.01) | |
| *G02B 27/40* | (2006.01) | |
| *B82Y 20/00* | (2011.01) | |
| *G02B 5/00* | (2006.01) | |

(52) U.S. Cl.
CPC ......... *G02B 6/0056* (2013.01); *G02B 6/0239* (2013.01); *G02B 27/40* (2013.01); *H01Q 15/0086* (2013.01); *H01Q 15/08* (2013.01); *B82Y 20/00* (2013.01); *G02B 5/00* (2013.01); *G02F 2202/32* (2013.01)

(56) References Cited

U.S. PATENT DOCUMENTS

| | | | |
|---|---|---|---|
| 8,174,341 B2 * | 5/2012 | Lee | H01P 7/082 |
| | | | 333/219 |
| 8,421,706 B2 | 4/2013 | Lee | |
| 8,674,792 B2 | 3/2014 | Yonak | |
| 8,988,759 B2 * | 3/2015 | Bowers | G02B 1/005 |
| | | | 359/263 |
| 9,733,544 B2 | 8/2017 | Sayyah | |
| 10,135,123 B1 * | 11/2018 | Arnitz | H01Q 1/247 |
| 10,359,513 B2 * | 7/2019 | Urzhumov | H01Q 3/22 |
| 10,788,624 B2 * | 9/2020 | Arnitz | H01Q 15/08 |
| 2012/0019892 A1 | 1/2012 | Bowers et al. | |

\* cited by examiner

ARTIFICIALLY-STRUCTURED MATERIALS WITH SMART ELEMENTS

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

This application is a continuation of U.S. patent application Ser. No. 15/839,330, filed Dec. 12, 2017, for ARTIFICIALLY-STRUCTURED MATERIALS WITH SMART ELEMENTS, which claims the benefit of U.S. Provisional Application No. 62/588,793, filed Nov. 20, 2017, for ARTIFICIALLY-STRUCTURED MATERIALS WITH SMART ELEMENTS, which is incorporated herein by reference in its entirety.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application. All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This disclosure relates to artificially-structured materials including an array of elements. Specifically, this disclosure relates to changing material properties of an artificially-structured material by changing operational properties of elements in an array of elements forming the artificially-structured material on a per-element basis.

SUMMARY

According to various embodiments, a system comprises an array of elements forming an artificially-structured material. The system can also comprise an array of tuning mechanisms included as part of the array of elements. One or more tuning mechanisms of the array of tuning mechanisms can change material properties of the artificially-structured material by changing one or more operational parameters of one or more elements of the array of elements on a per-element basis. The one or more tuning mechanisms can change the one or more operational parameters of the one or more elements on a per-element basis in response to stimuli detected by one or more sensors in a plurality of sensors included in the array of tuning mechanisms.

In various embodiments, one or more stimuli are detected by one or more sensors in a plurality of sensors included an array of elements forming an artificially-structured material. The array of elements can include an array of tuning mechanisms. Material properties of the artificially-structured material can be changed using one or more tuning mechanisms in the array of tuning mechanisms by changing one or more operational properties of the one or more elements on a per-element basis. The material properties of the artificially-structured material can be changed in response to the one or more stimuli detected by the one or more sensors.

In certain embodiments, a system comprises an array of elements forming an artificially-structured material. The system can also comprise an array of tuning mechanisms included as part of the array of elements and an array of programmable circuit modules. One or more tuning mechanisms of the array of tuning mechanisms can change material properties of the artificially-structured material by changing one or more operational parameters of one or more elements of the array of elements on a per-element basis. The one or more tuning mechanisms can change the one or more operational parameters of the one or more elements on a per-element basis using one or more programmable circuit modules of the plurality of programmable circuit modules.

In various embodiments, an artificially-structured material including an array of elements can receive one or more waves of energy. The array of elements can include an array of tuning mechanisms. Material properties of the artificially-structured material can be changed using one or more programmable circuit modules of a plurality of programmable circuit modules included as part of the array of tuning mechanisms by changing one or more operational properties of the one or more elements on a per-element basis. The material properties of the artificially-structured material can be changed as part of processing the one or more waves of energy at the artificially-structured material on a per-element basis.

In certain embodiments, a system comprises an array of elements forming an artificially-structured material. The system can also comprise an array of tuning mechanisms included as part of the array of elements and a plurality of individual data stores. One or more tuning mechanisms of the array of tuning mechanisms can change material properties of the artificially-structured material by changing one or more operational parameters of one or more elements of the array of elements on a per-element basis. The one or more tuning mechanisms can change the one or more operational parameters of the one or more elements on a per-element basis using data stored in one or more individual data stores of the plurality of individual data stores.

In various embodiments, an artificially-structured material including an array of elements can receive one or more waves of energy. The array of elements can include an array of tuning mechanisms. Material properties of the artificially-structured material can be changed using data stored in one or more individual data stores of a plurality of individual data stores included as part of the array of elements by changing one or more operational properties of the one or more elements on a per-element basis. The material properties of the artificially-structured material can be changed as part of processing the one or more waves of energy at the artificially-structured material on a per-element basis.

In certain embodiments, a system comprises an array of elements forming an artificially-structured material. At least a portion of the array of elements can be connected through one or more interconnects. The system can also comprise an array of tuning mechanisms included as part of the array of elements. One or more tuning mechanisms of the array of tuning mechanisms can change material properties of the artificially-structured material by changing one or more operational parameters of one or more elements of the array of elements on a per-element basis. The one or more tuning mechanisms can change the one or more operational parameters of the one or more elements on a per-element basis using communications transmitted to the one or more elements through the array of elements using the one or more interconnects.

In various embodiments, an artificially-structured material including an array of elements can receive one or more waves of energy. At least a portion of the array of elements can be connected through one or more interconnects. The array of elements can include an array of tuning mechanisms. Material properties of the artificially-structured material can be changed using communications transmitted to the one or more elements through the array of elements using the one or more interconnects by changing one or more operational properties of the one or more elements on a per-element basis. The material properties of the artificially-structured material can be changed as part of processing the one or more waves of energy at the artificially-structured material on a per-element basis.

DETAILED DESCRIPTION

Figure 1:
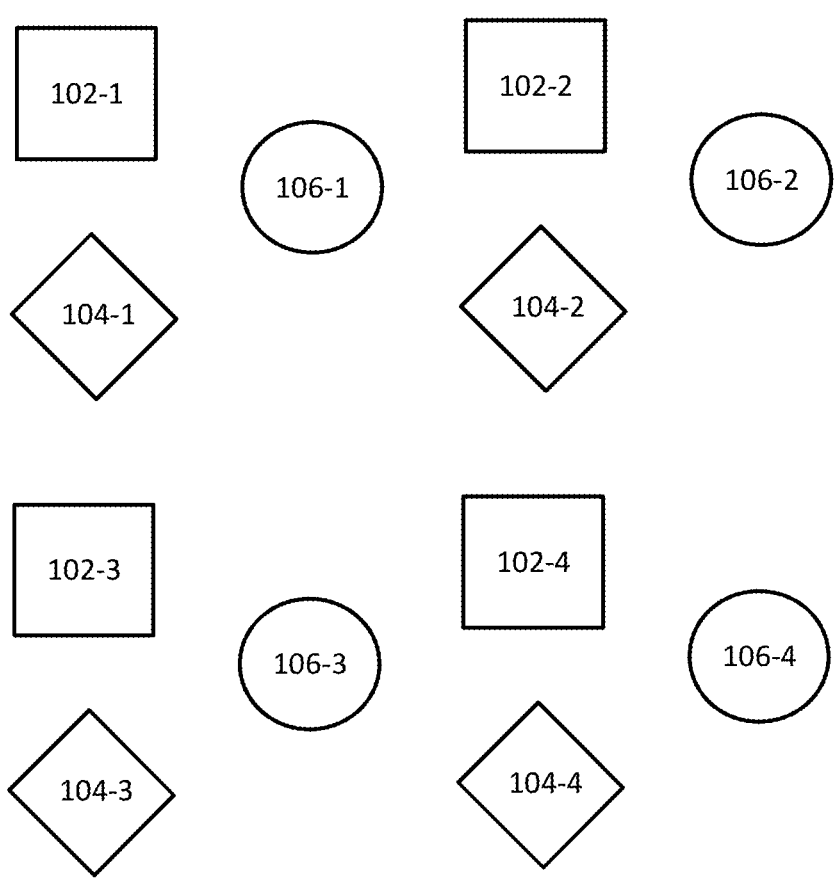
FIG. 1 illustrates an example artificially-structured material with sensors.

Transformation optics is an emerging field of electromagnetic engineering. Transformation optics devices include lenses that refract electromagnetic waves, where the refraction imitates the bending of light in a curved coordinate space (a "transformation" of a flat coordinate space), e.g. as described in A. J. Ward and J. B. Pendry, "Refraction and geometry in Maxwell's equations," J. Mod. Optics 43, 773 (1996), J. B. Pendry and S. A. Ramakrishna, "Focusing light using negative refraction," J. Phys. [Cond. Matt.] 15, 6345 (2003), D. Schurig et al, "Calculation of material properties and ray tracing in transformation media," Optics Express 14, 9794 (2006) ("D. Schurig et al (1)"), and in U. Leonhardt and T. G. Philbin, "General relativity in electrical engineering," New J. Phys. 8, 247 (2006), each of which is herein incorporated by reference. The use of the term "optics" does not imply any limitation with regards to wavelength; a transformation optics device may be operable in wavelength bands that range from radio wavelengths to visible wavelengths.

A first exemplary transformation optics device is the electromagnetic cloak that was described, simulated, and implemented, respectively, in J. B. Pendry et al, "Controlling electromagnetic waves," Science 312, 1780 (2006); S. A. Cummer et al, "Full-wave simulations of electromagnetic cloaking structures," Phys. Rev. E 74, 036621 (2006); and D. Schurig et al, "Metamaterial electromagnetic cloak at microwave frequencies," Science 314, 977 (2006) ("D. Schurig et al (2)"); each of which is herein incorporated by reference. See also J. Pendry et al, "Electromagnetic cloaking method," U.S. patent application Ser. No. 11/459,728, herein incorporated by reference. For the electromagnetic cloak, the curved coordinate space is a transformation of a flat space that has been punctured and stretched to create a hole (the cloaked region), and this transformation corresponds to a set of constitutive parameters (electric permittivity and magnetic permeability) for a transformation medium wherein electromagnetic waves are refracted around the hole in imitation of the curved coordinate space.

A second exemplary transformation optics device is illustrated by embodiments of the electromagnetic compression structure described in J. B. Pendry, D. Schurig, and D. R. Smith, "Electromagnetic compression apparatus, methods, and systems," U.S. patent application Ser. No. 11/982,353; and in J. B. Pendry, D. Schurig, and D. R. Smith, "Electromagnetic compression apparatus, methods, and systems," U.S. patent application Ser. No. 12/069,170; each of which is herein incorporated by reference. In embodiments described therein, an electromagnetic compression structure includes a transformation medium with constitutive parameters corresponding to a coordinate transformation that compresses a region of space intermediate first and second spatial locations, the effective spatial compression being applied along an axis joining the first and second spatial locations. The electromagnetic compression structure thereby provides an effective electromagnetic distance between the first and second spatial locations greater than a physical distance between the first and second spatial locations.

A third exemplary transform optics device is illustrated by embodiments of the electromagnetic cloaking and/or translation structure described in J. T. Kare, "Electromagnetic cloaking apparatus, methods, and systems," U.S. patent application Ser. No. 12/074,247; and in J. T. Kare, "Electromagnetic cloaking apparatus, methods, and systems," U.S. patent application Ser. No. 12/074,248; each of which is herein incorporated by reference. In embodiments described therein, an electromagnetic translation structure includes a transformation medium that provides an apparent location of an electromagnetic transducer different then an actual location of the electromagnetic transducer, where the transformation medium has constitutive parameters corresponding to a coordinate transformation that maps the actual location to the apparent location. Alternatively or additionally, embodiments include an electromagnetic cloaking structure operable to divert electromagnetic radiation around an obstruction in a field of regard of the transducer (and the obstruction can be another transducer).

A fourth exemplary transformation optics device is illustrated by embodiments of the various focusing and/or focus-adjusting structures described in J. A. Bowers et al. "Focusing and sensing apparatus, methods, and systems." U.S. patent application Ser. No. 12/156,443; J. A. Bowers et al, "Emitting and focusing apparatus, methods, and systems." U.S. patent application Ser. No. 12/214,534; J. A. Bowers et al, "Negatively-refractive focusing and sensing apparatus, methods, and systems. U.S. patent application Ser. No. 12/220,705; J. A. Bowers et al., "Emitting and negatively-refractive focusing apparatus, methods, and systems. U.S. patent application Ser. No. 12/220,703; J. A. Bowers et al. "Negatively-refractive focusing and sensing apparatus, methods, and systems. U.S. patent application Ser. No. 12/228,140; and J. A. Bowers et al., "Emitting and negatively-refractive focusing apparatus, methods, and systems. U.S. patent application Ser. No. 12/228,153; each of which is herein incorporated by reference. In embodiments described therein, a focusing and/or focusing-structure includes a transformation medium that provides an extended depth of focus/field greater than a nominal depth of focus/field, or an interior focus/field region with an axial magnification that is substantially greater than or less than one.

Additional exemplary transformation optics devices are described in D. Schurig et al., "Transformation-designed optical elements. Opt. Exp. 15, 14772 (2007); M. Rahmetal, "Optical design of reflectionless complex media by finite embedded coordinate transformations." Phys. Rev. Lett. 100, 063903 (2008); and A. Kildishev and V. Shalaev, "Engineering space for light via transformation optics. Opt. Lett. 33,43 (2008); each of which is herein incorporated by reference. In general, for a selected coordinate transformation, a transformation medium can be identified wherein electromagnetic fields evolve as in a curved coordinate space corresponding to the selected coordinate transformation.

Embodiments of an indefinite medium and/or a transformation medium (including embodiments of indefinite transformation media) can be realized using the artificially-structured materials. Generally speaking, the electromagnetic properties of the artificially-structured materials derive from their structural configurations, rather than or in addition to their material composition.

In some embodiments, the artificially-structured materials are photonic crystals. Some exemplary photonic crystals are described in J. D. Joannopoulos et al., Photonic Crystals Molding the Flow of Light, 2" Edition, Princeton Univ. Press, 2008, which is incorporated by reference herein. In a photonic crystals, photonic dispersion relations and/or photonic band gaps are engineered by imposing a spatially varying pattern on an electromagnetic material (e.g. a conducting, magnetic, or dielectric material) or a combination of electromagnetic materials. The photonic dispersion relations translate to effective constitutive parameters (e.g. permittivity, permeability, index of refraction) for the photonic crystal. The spatially-varying pattern is typically periodic, quasi-periodic, or colloidal periodic, with a length scale comparable to an operating wavelength of the photonic crystal.

In other embodiments, the artificially-structured materials are metamaterials. Some exemplary metamaterials are described in R. A. Hyde et al., "Variable metamaterial apparatus." U.S. patent application Ser. No. 11/355,493: D. Smith et al., "Metamaterials." International Application No. PCT/US2005/026052: D. Smith et al., "Metamaterials negative refractive index." Science 305,788 (2004); D. Smith et al., "Indefinite materials. U.S. patent application Ser. No. 10/525,191; C. Caloz, and T. Itoh, Electromagnetic Metamaterials. Transmission Line Theory and Microwave Applications, Wiley-Interscience, 2006; N. Engheta and R. W. Ziolkowski, eds., Metamaterials. Physics and Engineering Explorations, Wiley-Interscience, 2006; and A. K. Sarychev and V. M. Shalaev, Electrodynamics of Metamaterials, World Scientific, 2007; each of which is herein incorporated by reference.

Metamaterials generally feature subwavelength elements, i.e. structural elements with portions having electromagnetic length scales smaller than an operating wavelength of the metamaterial, and the subwavelength elements have a collective response to electromagnetic radiation that corresponds to an effective continuous medium response, characterized by an effective permittivity, an effective permeability, an effective magnetoelectric coefficient, or any combination thereof. For example, the electromagnetic radiation may induce charges and/or currents in the subwavelength elements, whereby the subwavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators—built from nonmagnetic conductors can exhibit an effective magnetic permeability (c.f. J. B. Pendry et al, "Magnetism from conductors and enhanced nonlinear phenomena," IEEE Trans. Micro. Theo. Tech. 47, 2075 (1999), herein incorporated by reference). Some metamaterials have "hybrid" electromagnetic properties that emerge partially from structural characteristics of the metamaterial, and partially from intrinsic properties of the constituent materials. For example, G. Dewar, "A thin wire array and magnetic host structure with n<0," J. Appl. Phys. 97, 10Q101 (2005), herein incorporated by reference, describes a metamaterial consisting of a wire array (exhibiting a negative permeability as a consequence of its structure) embedded in a nonconducting ferrimagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the subwavelength elements. The selected permittivites, permeabilities, and/or magnetoelectric coefficients can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/visible wavelengths; the latter wavelengths are attainable, e.g., with nanostructured materials such as nanorod pairs or nano-fishnet structures (c.f. S. Linden et al, "Photonic metamaterials: Magnetism at optical frequencies," IEEE J. Select. Top. Quant. Elect. 12, 1097 (2006) and V. Shalaev, "Optical negative-index metamaterials," Nature Photonics 1, 41 (2007), both herein incorporated by reference). An example of a three-dimensional metamaterial at optical frequencies, an elongated-split-ring "woodpile" structure, is described in M. S. Rill et al, "Photonic metamaterials by direct laser writing and silver chemical vapour deposition," Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffman, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

While artificially-structured materials are described with reference to electromagnetic waves of energy, in various embodiments artificially-structured materials described herein can be configured to process or otherwise interact with other applicable waves of energy. For example, artificially-structured materials described herein can process acoustic waves of energy.

According to various embodiments, a system comprises an array of elements forming an artificially-structured material. The system can also comprise an array of tuning mechanisms included as part of the array of elements. One or more tuning mechanisms of the array of tuning mechanisms can change material properties of the artificially-structured material by changing one or more operational parameters of one or more elements of the array of elements on a per-element basis. The one or more tuning mechanisms can change the one or more operational parameters of the one or more elements on a per-element basis in response to stimuli detected by one or more sensors in a plurality of sensors included in the array of tuning mechanisms.

In various embodiments, one or more stimuli are detected by one or more sensors in a plurality of sensors included an array of elements forming an artificially-structured material. The array of elements can include an array of tuning mechanisms. Material properties of the artificially-structured material can be changed using one or more tuning mechanisms in the array of tuning mechanisms by changing one or more operational properties of the one or more elements on a per-element basis. The material properties of the artificially-structured material can be changed in response to the one or more stimuli detected by the one or more sensors.

In certain embodiments, a system comprises an array of elements forming an artificially-structured material. The system can also comprise an array of tuning mechanisms included as part of the array of elements and an array of programmable circuit modules. One or more tuning mechanisms of the array of tuning mechanisms can change material properties of the artificially-structured material by changing one or more operational parameters of one or more elements of the array of elements on a per-element basis. The one or more tuning mechanisms can change the one or more operational parameters of the one or more elements on a per-element basis using one or more programmable circuit modules of the plurality of programmable circuit modules.

In various embodiments, an artificially-structured material including an array of elements can receive one or more waves of energy. The array of elements can include an array of tuning mechanisms. Material properties of the artificially-structured material can be changed using one or more programmable circuit modules of a plurality of programmable circuit modules included as part of the array of tuning mechanisms by changing one or more operational properties of the one or more elements on a per-element basis. The material properties of the artificially-structured material can be changed as part of processing the one or more waves of energy at the artificially-structured material on a per-element basis.

In certain embodiments, a system comprises an array of elements forming an artificially-structured material. The system can also comprise an array of tuning mechanisms included as part of the array of elements and a plurality of individual data stores. One or more tuning mechanisms of the array of tuning mechanisms can change material properties of the artificially-structured material by changing one or more operational parameters of one or more elements of the array of elements on a per-element basis. The one or more tuning mechanisms can change the one or more operational parameters of the one or more elements on a per-element basis using data stored in one or more individual data stores of the plurality of individual data stores.

In various embodiments, an artificially-structured material including an array of elements can receive one or more waves of energy. The array of elements can include an array of tuning mechanisms. Material properties of the artificially-structured material can be changed using data stored in one or more individual data stores of a plurality of individual data stores included as part of the array of elements by changing one or more operational properties of the one or more elements on a per-element basis. The material properties of the artificially-structured material can be changed as part of processing the one or more waves of energy at the artificially-structured material on a per-element basis.

In certain embodiments, a system comprises an array of elements forming an artificially-structured material. At least a portion of the array of elements can be connected through one or more interconnects. The system can also comprise an array of tuning mechanisms included as part of the array of elements. One or more tuning mechanisms of the array of tuning mechanisms can change material properties of the artificially-structured material by changing one or more operational parameters of one or more elements of the array of elements on a per-element basis. The one or more tuning mechanisms can change the one or more operational parameters of the one or more elements on a per-element basis using communications transmitted to the one or more elements through the array of elements using the one or more interconnects.

In various embodiments, an artificially-structured material including an array of elements can receive one or more waves of energy. At least a portion of the array of elements can be connected through one or more interconnects. The array of elements can include an array of tuning mechanisms. Material properties of the artificially-structured material can be changed using communications transmitted to the one or more elements through the array of elements using the one or more interconnects by changing one or more operational properties of the one or more elements on a per-element basis. The material properties of the artificially-structured material can be changed as part of processing the one or more waves of energy at the artificially-structured material on a per-element basis.

Some of the infrastructure that can be used with embodiments disclosed herein is already available, such as general-purpose computers, RF antennas, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates an example artificially-structured material 100 with sensors. The artificially-structured material 100 includes a first element 102-1, a second element 102-2, a third element 102-3, and a fourth element 102-4 (herein referred to as "elements 102"). The elements 102 can form an array of elements as part of the artificially-structured material 100. While the example artificially-structured material 100 shown in FIG. 1 is illustrated to include four elements 102, in certain embodiments, the artificially-structured material 100 can include fewer than four elements or more than four elements. For example, the artificially-structured material 100 can include more than four elements that operate together as part of a transformation optics device.

The example artificially-structured material 100 shown in FIG. 1 includes a first tuning mechanism 104-1, a second tuning mechanism 104-2, a third tuning mechanism 104-3, and a fourth tuning mechanism 104-4 (herein referred to as "tuning mechanisms 104"). The tuning mechanisms 104 can form an array or a plurality of tuning mechanisms as part of the artificially-structured material 100. While the example artificially-structured material 100 shown in FIG. 1 is illustrated to include four tuning mechanisms 104, in certain embodiments, the artificially-structured material 100 can include fewer than four tuning mechanisms or more than four tuning mechanisms. For example, the artificially-structured material 100 can include more than four tuning mechanisms that operate together as part of a metamaterial.

The tuning mechanisms 104 can each correspond to one or more elements in the artificially-structured material 100. For example, the first tuning mechanism 104-1 can uniquely correspond to, e.g. only control operational properties of, the first element 102-1. In another example, the first tuning mechanism 104-1 can uniquely correspond to, e.g. only control operational properties of, the first element 102-1 and the second element 102-2. While the tuning mechanisms 104 are shown to be separate from the elements 102, the tuning mechanisms 104 can be included as part of the elements 102. For example, as the elements 102 are fabricated, the tuning mechanisms 104 can be fabricated along with the elements 102 as part of the elements 102.

The tuning mechanisms 104 can change material properties of the artificially-structured material 100. More specifically, the tuning mechanisms 104 can change material properties of the artificially-structured material 100 by controlling operational properties of the elements 102. For example, as will be discussed in greater detail later, the tuning mechanisms 104 can control resonant frequencies of the elements 104 as part of controlling operational properties of the elements 102 to change material properties of the artificially-structured material 100.

The tuning mechanisms 104 can change material properties of the artificially-structured material 100 on a per-element basis. More specifically, the tuning mechanisms 104 can change operational properties of the elements 102 on a per-element basis change material properties of the artificially-structured material 100 on a per-element basis. In changing operational properties of the elements 102 on a per-element basis, the tuning mechanisms 104 can change the operational properties of one or more elements of the elements 102 independent from changing the operational properties of one or more additional and separate elements of the elements 102. For example, the first tuning mechanism 104-1 can change a resonant frequency of the first element 102-1 by a first amount independent of the second tuning mechanism 104-2 can refrain from changing a resonant frequency of the second element 102-2. In another example, the first tuning mechanism 104-1 can change a resonant frequency of the first element 102-1 by a first amount independent of a the second tuning mechanism 104-2 changing a resonant frequency of the second element 102-2 by a second amount, potentially the same as the first amount.

The tuning mechanisms 104 can change resonant frequencies of the elements 102 by changing either or both one or more capacitances and inductances of the elements 102. More specifically, the tuning mechanisms 104 can change resonant frequencies of the elements 102 by changing either or both capacitances and inductances of the elements 102 on a per-element basis. For example, the first tuning mechanism 104-1 can change an inductance of the first element 102-1 to change a resonant frequency of the first element 102-1 independent of the second tuning mechanism 104-2 changing or refraining from changing an inductance of the second element 102-2. Similarly, the second tuning mechanism 104-2 can change a capacitance of the second element 102-2 to change a resonant frequency of the second element 102-2 independent of the first tuning mechanism 104-1 changing or refraining from changing a capacitance of the first element 102-1.

Additionally, the tuning mechanisms 104 can change operational properties of the elements 102 by changing relative physical positions between the elements 102. Specifically, the tuning mechanisms 104 can change resonant frequencies of the elements 102 by changing relative physical positions of the elements 102 with respect to each other. In changing relative physical positions between the elements 102, the tuning mechanisms 104 can change resonant frequencies of the elements 102. For example, the first tuning mechanism 104-1 can change a resonant frequency of the first element 102-1 by changing a relative position of the first element 102-1 with respect to the second element 102-2.

The tuning mechanisms 104 can change operational properties of the elements 102 by changing relative positions between two or more sites within each element of the elements 102. Specifically, the tuning mechanisms 104 can change resonant frequencies of the elements 102 by changing physical positions of sites within each element of the elements 102 to change resonant frequencies of each element of the elements 102. Additionally, the tuning mechanisms 104 can change operational properties of the elements 102 by controlling relative orientations of the elements 102 with respect to each other or sites in the elements 102 with respect to each other. More specifically, the tuning mechanisms 104 can change resonant frequencies of the elements 102 by changing positions of sites in the elements 102 with respect to each other.

In changing operational properties of the elements 102, the tuning mechanisms 104 can change relative positions, e.g. sites within the elements 102, of either or both capacitive components of the elements 102 and inductive components of the elements 102 with respect to each other. More specifically, the tuning mechanisms 104 can change relative positions of either or both capacitive components of the elements 102 and inductive components of the elements 102 with respect to each other to change resonant frequencies of the elements 102. Additionally, the tuning mechanisms 104 can change relative orientations, e.g. as sites within the elements 102, of either or both capacitive components of the elements 102 and inductive components of the elements 102 with respect to each other to change resonant frequencies of the elements 102.

The tuning mechanisms 104 can change one or more physical positions of the elements 102 and/or sites within the elements 102 on a micrometer scale. More specifically, the tuning mechanisms 104 can change physical positions of the elements 102 and/or sites within the elements 102 on a scale that is smaller than a wave of energy for which the elements 102 are resonant. For example, the tuning mechanisms 104 can cause the elements 102 to change position on a scale that is less than a wavelength of a wave of energy that the elements 102 are configured to process. Further, the tuning mechanisms can change physical positions of the elements 102 and/or sites within the elements 102 on a scale that is less than 10% of a wave of energy for which the elements 102 are resonant. For example the tuning mechanisms 104 can cause the elements 102 to change position with respect to each other on a scale that is less than 10% of a wavelength of a wave energy that the elements 102 are configured to process.

Further, the tuning mechanisms 104 can change or cause changing of an overall mass of the elements 102, as part of changing operational properties of the elements 102 to change material properties of the artificially-structured material 100. For example, the first tuning mechanism 104-1 can add of cause the addition of mass to the first element 102-1 to increase an overall mass of the first element 102-1, e.g. as part of changing operational properties of the first element 102-1. In another example, the second tuning mechanism 104-2 can remove or cause the removal of mass from the second element 102-2 to decrease an overall mass of the second element 102-2, e.g. as part of changing operational properties of the second element 102-2. In The tuning mechanisms 104 can change or cause changing of an overall mass of the elements 102 to change resonant frequencies of the elements 102.

In changing operational properties of the elements 102, the tuning mechanisms 104 can quench a wave response of the elements 102. More specifically, the tuning mechanisms 104 can quench a wave response of the elements to waves of energy processed by the artificially-structured material 100. For example, the first tuning mechanism 104-1 can quench the first element 102-1 such that the first element 102-1 does not interact with or otherwise process waves of energy being processed by the artificially-structured material 100. The tuning mechanisms 104 can quench wave responses of the elements 102 on a per-element basis, e.g. as part of changing operational properties of the elements 102 on a per-element basis.

The tuning mechanisms 104 can change the operational properties of the elements 102 to change one or more characteristics of waves of energy processed by the artificially-structured material 100. Characteristics of waves of energy processed by the artificially-structured material 100 include applicable properties of the waves of energy processed by the artificially-structured material 100. Examples of characteristics of waves of energy capable of being changed by the elements 102 include wavelengths of the waves of energy, phases of the waves of energy, amplitudes of the waves of energy, polarizations of the waves of energy, propagation directions of the waves of energy, and absorption characteristics of the waves of energy. For example, the tuning mechanisms 104 can change resonant frequencies of the elements 102, e.g. on a per-element basis, to change propagation directions of either or both electromagnetic waves and acoustic waves processed by the artificially-structured material 100.

Further, the tuning mechanisms 104 can change operational properties of the elements 102 based on, at least in part, outside input. Outside input can include input received from an outside source separate from the artificially-structured material 100. Specifically, outside input can include operation instructions generated and received from an administrator of a device incorporating the artificially-structured material 100. For example, an administrator can specify, through outside input, to switch from operating on electromagnetic waves of energy to operating on acoustic waves of energy. Further in the example, the tuning mechanisms 104 can subsequently configure the elements 102 to process acoustic waves of energy by changing the operational properties of the elements 102 in response to the outside input received from the administrator.

The example artificially-structured material 100 shown in FIG. 1 includes a first sensor 106-1, a second sensor 106-2, a third sensor 106-3, and a fourth sensor 106-4 (herein referred to as "sensors 106"). The sensors 106 can form an array or a plurality of sensors as part of the artificially-structured material 100. While the example artificially-structured material 100 shown in FIG. 1 is illustrated to include four sensors 106, in certain embodiments, the artificially-structured material 100 can include fewer than four sensors or more than four sensors. For example, the artificially-structured material 100 can include more than four sensors that operate together as a transformation acoustics device.

The sensors 106 can each correspond to one or more elements in the artificially-structured material 100. For example, the first sensor 106-1 can uniquely correspond to, e.g. be used to control operation of, the first element 102-1. In another example, the first sensor 106-1 can uniquely correspond to, e.g. be used to control operation of, the first element 102-1 and the second element 102-2. While the sensors 106 are shown to be separate from the elements 102, the sensors 106 can be included as part of the elements 102. For example, as the elements 102 are fabricated, the sensors 106 can be fabricated along with the elements 102 as part of the elements 102. In various embodiments, each element in the artificially-structured material 100 can have a uniquely corresponding sensor. For example, each element in the artificially-structured material 100 can have a corresponding sensor formed as part of the element.

The sensors 106 can function to detect stimuli. More specifically, the sensors 106 can detect stimuli for purposes of controlling operational properties of the elements 102. Subsequently, the tuning mechanisms 104 can control operational properties of the elements 102 based on stimuli detected by the sensors 106 as part of changing material properties of the artificially-structured material 100, potentially on a per-element basis. For example, the first sensor 106-1 can detect stimuli, e.g. as indicated by sensor input, and the first tuning mechanism 104-1 can control operation of the first element 102-1 based on the stimuli on a per-element basis. Further in the example, the second tuning mechanism 104-2 can control operation of the second element 102-2 on a per-element basis according to the stimuli detected by the first sensor 106-1.

The sensors 106 can include applicable sensors for detecting characteristics of waves of energy processed by the artificially-structured material 100 as part of detecting stimuli. More specifically, the sensors 106 can be applicable sensors for identifying one or a combination of wavelengths of waves of energy, phases of waves of energy, amplitudes of waves of energy, local intensities of waves of energy, polarizations of waves of energy, and propagation directions of waves of energy. Subsequently, characteristics of waves of energy detected by the sensors 106, as indicated by generated sensor input, can be used by the tuning mechanisms 104 to control operational properties of the elements 102, e.g. on a per-element basis. For example, operational properties of the first elements 102-1 can be controlled by the first tuning mechanism 104-1 to change an outgoing propagation direction of a wave of energy based on an incoming propagation direction of the wave, as detected by the first sensor 106-1.

Additionally, the sensors 106 can include applicable sensors for detecting characteristics of an environment at the artificially-structured material 100. Characteristics of an environment at the artificially-structured material 100 can include applicable environmental characteristics. For example, characteristics of an environment at the artificially-structured material 100 can include a location, a specific time, humidity, displacement of the artificially-structured material 100, and a temperature. Subsequently, characteristics of an environment detected by the sensors 106, as indicated by generated sensor input, can be used by the tuning mechanisms 104 to control operational properties of the elements 102, e.g. on a per-element basis. For example, the first tuning mechanism 104-1 can change a resonant frequency of the first element 102-1 based on a temperature at the artificially-structured material 100.

The tuning mechanisms 104 can change operational properties of an element of the elements 102 based on stimuli detected by sensors corresponding to other elements of the elements 102. For example, the first tuning mechanism 104-1 can receive sensor input indicating stimuli detected by the second sensor 106-2 corresponding to the second element 102-2. Subsequently, the first tuning mechanism 104-1 can change operational properties of the first element 102-1 based on the sensor input indicating the stimuli detected by the second sensor 106-2. As a result, operational properties of the elements 102 can be controlled based on stimuli detected across different sensors, and not just only based on stimuli detected by a sensor that corresponds to each element 102.

The tuning mechanisms 104 can be in operational communication with the sensors 106. Specifically, the tuning mechanisms 104 can be in operational communication with sensors corresponding to elements that correspond to the tuning mechanisms. For example, the first tuning mechanism 104-1 can be in operational communication with the first sensor 106-1. Further, the tuning mechanisms 104 can be in operational communication with sensors corresponding to different elements than those associated with the tuning mechanisms 104. For example, the first tuning mechanism 104-1 can be in operational communication with the third sensor 106-3.

The tuning mechanisms 104 can be in operational communication with the sensors 106 through either or both electronic and optical circuitry. Circuitry coupling the tuning mechanisms 104 with the sensors 106 can be used to transmit sensor input from the sensors 106 to the tuning mechanisms 104. The tuning mechanisms 104 can then use the input received through the circuitry from the sensors 106 to control operational properties of the elements 102, e.g. on a per-element basis. Circuitry used to operationally connect the tuning mechanisms 104 with the sensors 106 can be integrated as part of the artificially-structured material 100.

The elements 102 can determine, on a per-element basis, whether to process a specific wave of energy at the artificially-structured material 100. For example, a specific element of the elements 102 can determine whether to process a wave of energy at the specific element. The elements 102 can determine whether to process a wave of energy on a per-element basis at the artificially-structured material 100 based on characteristics of the wave of energy. For example, the first element 102-1 can determine by itself whether to process a wave of energy based on a wavelength of the wave. Further in the example, the second element 102-2 can determine by itself whether to process the wave of energy based on the wavelength of the wave.

Further, the elements 102 can process a specific wave of energy based on a determination, made on a per-element basis, to process the specific wave of energy. More specifically, the elements 102 can configure their corresponding operational properties, on a per-element basis, to process the specific wave of energy if they determine to process the specific wave of energy. Subsequently, the elements 102 can process the specific wave after or during configuration of their operational properties to process the specific wave of energy. The elements 102 can determine how to configure their operational parameters for purposes of processing the specific wave. More specifically, the elements 102 can determine how to configure their operational parameters in order to process the specific wave of energy based on characteristics of the wave of energy.

The elements 102 can determine whether and how to process a specific wave of energy, on a per-element basis, based on either or both stimuli detected by the sensors 106 and outside input. For example, the elements 102 can determine, on a per-element basis, to process a specific wave of energy if outside input instructs the elements 102 to process the specific wave of energy. In another example, the elements 102 can determine, on a per-element basis, how to configure their operational properties based on a propagation direction of a specific wave of energy detected by one or more sensors of the sensors 106.

Further, the elements 102 can include programmable circuitry integrated as part of the elements 102. Programmable circuitry integrated as part of the elements 102 can be used by the elements 102 to determine whether to process a specific wave of energy and how to process a specific wave of energy. For example, programmable circuitry integrated as part of the elements 102 can be used by the elements 102 to determine how to configure their operational properties for purposes of processing a specific wave of energy. Additionally, programmable circuitry integrated as part of the elements 102 can be used in controlling the tuning mechanisms 104. For example, programmable circuitry integrated as part of the elements 102 can be used in controlling the tuning mechanisms 104 for changing operational properties of the elements 102, e.g. by the elements 102 themselves.

Additionally, the elements 102 can include data storage circuitry integrated as part of the elements 102. Data storage circuitry integrated as part of the elements 102 can be used by the elements 102 to determine whether to process a specific wave of energy and how to process a specific wave of energy. For example, data storage circuitry integrated as part of the elements 102 can be used by the elements 102 to determine, on a per-element basis, whether the elements should process a specific wave of energy. Additionally, data storage circuitry integrated as part of the elements 102 can be used in controlling the tuning mechanisms 104. For example, data storage circuitry integrated as part of the elements 102 can be used in controlling the tuning mechanisms 104 for changing operational properties of the elements 102, e.g. by the elements 102 themselves.

Figure 2:
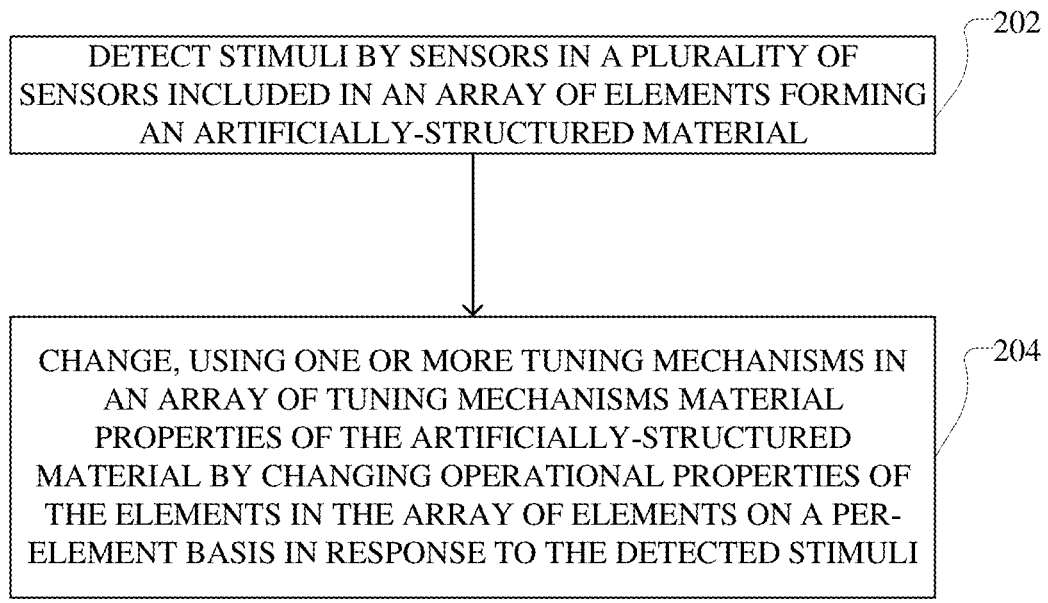
FIG. 2 is a flowchart of an example method of changing material properties of an artificially-structured material on a per-element basis using stimuli detected by sensors.

FIG. 2 is a flowchart 200 of an example method of changing material properties of an artificially-structured material on a per-element basis using stimuli detected by sensors. At step 202, stimuli are detected by sensors in a plurality of sensors included in an array of elements forming an artificially-structured material. Stimuli can be detected by applicable sensors integrated in an array of elements forming an artificially-structured material, such as the sensors 106. Stimuli detected by the sensors at the artificially-structured material can include characteristics of waves of energy processed by the artificially-structured material. Additionally, stimuli detected by the sensors at the artificially-structured material can include characteristics of an environment at the artificially-structured material. Each sensor in the array of sensors can be integrated as part of and uniquely correspond to a single element in the array of elements.

At step 204, one or more tuning mechanisms in an array of tuning mechanisms are used to change material properties of the artificially-structured material by changing operational properties of the elements in the artificially-structured material on a per-element basis in response to the detected stimuli. The tuning mechanisms can be applicable tuning mechanisms for controlling operational properties of the elements on a per-element basis in response to detected stimuli, such as the tuning mechanisms 104. The tuning mechanisms in the array of tuning mechanisms can be implemented as part of the array of elements. More specifically, each tuning mechanism in the array of tuning mechanisms can be integrated as part of and uniquely correspond to a single element in the array of elements. In controlling operational properties of the elements, the tuning mechanisms can control resonant frequencies of the elements on a per-element basis and/or quenching a wave response of the elements on a per-element basis.

Figure 3:
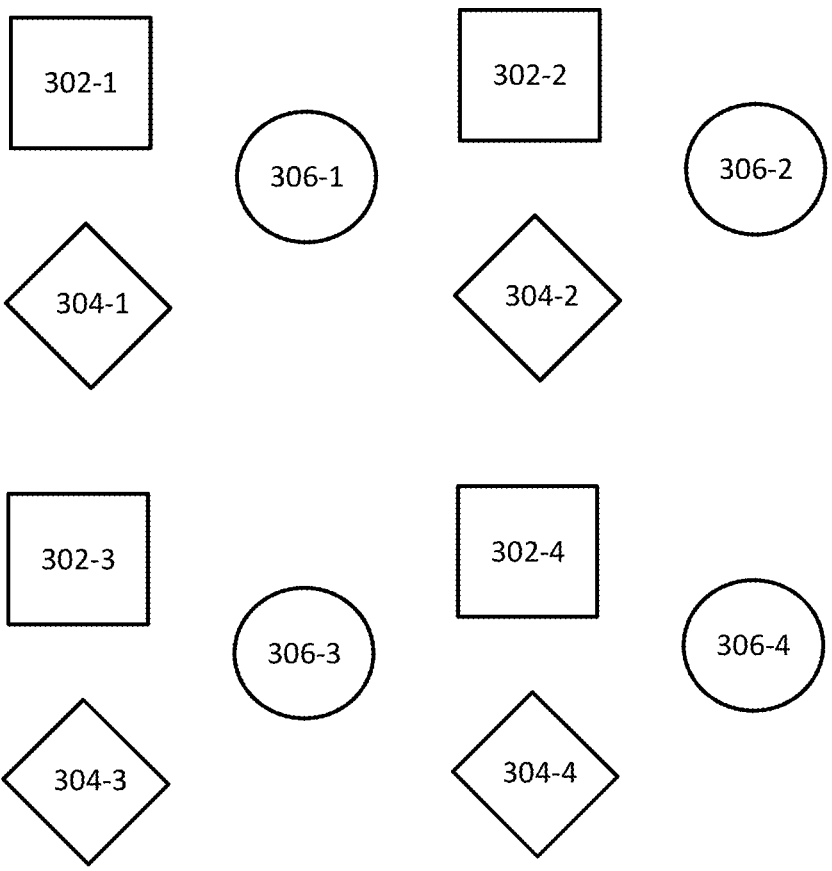
FIG. 3 illustrates an example artificially-structured material with programmable circuit modules.

FIG. 3 illustrates an example artificially-structured material 300 with programmable circuit modules. The artificially-structured material 300 includes a first element 302-1, a second element 302-2, a third element 302-3, and a fourth element 302-4 (herein referred to as "elements 302"). The elements 302 can form an array of elements as part of the artificially-structured material 300. While the example artificially-structured material 300 shown in FIG. 3 is illustrated to include four elements 302, in certain embodiments, the artificially-structured material 300 can include fewer than four elements or more than four elements. For example, the artificially-structured material 300 can include more than four elements that operate together as part of a transformation acoustics device.

The example artificially-structured material 300 shown in FIG. 3 includes a first tuning mechanism 304-1, a second tuning mechanism 304-2, a third tuning mechanism 304-3, and a fourth tuning mechanism 304-4 (herein referred to as "tuning mechanisms 304"). The tuning mechanisms 304 can form an array or a plurality of tuning mechanisms as part of the artificially-structured material 300. While the example artificially-structured material 300 shown in FIG. 3 is illustrated to include four tuning mechanisms 304, in certain embodiments, the artificially-structured material 300 can include fewer than four tuning mechanisms or more than four tuning mechanisms. For example, the artificially-structured material 300 can include more than four tuning mechanisms that operate together as part of a metamaterial.

The tuning mechanisms 304 can each correspond to one or more elements in the artificially-structured material 300.

For example, the first tuning mechanism 304-1 can uniquely correspond to, e.g. only control operational properties of, the first element 302-1. In another example, the first tuning mechanism 304-1 can uniquely correspond to, e.g. only control operational properties of, the first element 302-1 and the second element 302-2. While the tuning mechanisms 304 are shown to be separate from the elements 302, the tuning mechanisms 304 can be included as part of the elements 302. For example, as the elements 302 are fabricated, the tuning mechanisms 304 can be fabricated along with the elements 302 as part of the elements 302.

The tuning mechanisms 304 can function according to applicable tuning mechanisms for changing material properties of the artificially-structured material 300, such as the tuning mechanisms 104 shown in FIG. 1. More specifically, the tuning mechanisms 304 can change material properties of the artificially-structured material 300 by changing operational properties of the elements 302 on a per-element basis. For example, the tuning mechanisms 304 can change operational properties of the elements 302 on a per-element basis by changing resonant frequencies of the elements 302 on a per-element basis. In various embodiments, the tuning mechanisms 304 can change operational properties of the elements 302 on a per-element basis according to stimuli detected by applicable sensors, such as the sensors 106 shown in FIG. 1.

The example artificially-structured material 300 includes a first programmable circuit module 306-1, a second programmable circuit module 306-2, a third programmable circuit module 306-3, and a fourth programmable circuit module 306-4 (herein referred to as "programmable circuit modules 306"). The programmable circuit modules 306 can form an array or a plurality of programmable circuit modules 306 as part of the artificially-structured material 300. While the example artificially-structured material 300 shown in FIG. 3 is illustrated to include four programmable circuit modules 306, in certain embodiments, the artificially-structured material 300 can include fewer than four programmable circuit modules or more than four programmable circuit modules. For example, the artificially-structured material 300 can include more than four programmable circuit modules that operate together as a metamaterial-based device.

The programmable circuit modules 306 can each correspond to one or more elements in the artificially-structured material 300. For example, the first programmable circuit module 306-1 can uniquely correspond to, e.g. be used to control operation of, the first element 302-1. In another example, the first programmable circuit module 306-1 can uniquely correspond to, e.g. be used to control operation of, the first element 302-1 and the second element 302-2. While the programmable circuit modules 306 are shown to be separate from the elements 302, the programmable circuit modules 306 can be included as part of the elements 302 and/or the tuning mechanisms 304. For example, as the elements 302 are fabricated, the programmable circuit modules 306 can be fabricated along with the elements 302 as part of the elements 302. In various embodiments, each element in the artificially-structured material 300 can have a uniquely corresponding programmable circuit module. For example, each element in the artificially-structured material 300 can have a corresponding programmable circuit module formed as part of the element.

The tuning mechanisms 304 can change operational properties of the elements 302 on a per-element basis using the programmable circuit modules 306. Specifically, the programmable circuit modules 306 can control the tuning mechanisms 304 to change operational properties of the elements 302 on a per-element basis using received outside input. Additionally, the programmable circuit modules 306 can control the tuning mechanisms 304 to change operational properties of the elements 302 on a per-element basis using stimuli detected by sensors. For example, the programmable circuit modules 306 can control the tuning mechanisms 304 based on characteristics of waves of energy processed by the artificially-structured material 300, as detected by sensors. Sensors used by the programmable circuit modules 306 in controlling the tuning mechanisms 304 can be applicable sensors for detecting stimuli at the artificially-structured material 300, such as the sensors 106 in the example artificially-structured material 100 shown in FIG. 1. For example, sensors can be implemented at each of the elements 302 and used by the programmable circuit modules 306 to control operation of the tuning mechanisms 304.

The programmable circuit modules 306 can determine, on a per-element basis, whether to process a specific wave of energy at the artificially-structured material 100. More specifically, the programmable circuit modules 306 can determine whether to process a wave of energy at a specific element of the elements 302. The programmable circuit modules 306 can determine whether to process a specific wave of energy at a specific element based on characteristics of the wave of energy. For example, the first programmable circuit module 306-1 can determine whether to process a wave of energy at the first element 302-1 based on a wavelength of the wave.

Further, the programmable circuit modules 306 can process a specific wave of energy, e.g. by controlling the tuning mechanisms 304, based on a determination, made on a per-element basis, to process the specific wave of energy. More specifically, the programmable circuit modules 306 can configure corresponding operational properties of the elements 302 using the tuning mechanisms 304, on a per-element basis, to process the specific wave of energy if it is determined to process the specific wave of energy. Subsequently, the elements 302 can process the specific wave after or during configuration of their operational properties to process the specific wave of energy. The programmable circuit modules 306 can determine how to configure the operational parameters of the elements 302 for purposes of processing the specific wave. More specifically, the programmable circuit modules 306 can determine how to configure operational parameters of the elements 302 in order to process the specific wave of energy based on characteristics of the wave of energy.

The programmable circuit modules 306 can determine whether and how to process a specific wave of energy, on a per-element basis, based on either or both stimuli detected by sensors and outside input. For example, the programmable circuit modules 306 can determine, on a per-element basis, to process a specific wave of energy if outside input instructs the programmable circuit modules 306 to process the specific wave of energy using specific elements. In another example, the programmable circuit modules 306 can determine, on a per-element basis, how to configure operational properties of the elements 302 based on a propagation direction of a specific wave of energy detected by one or more sensors.

Further, the programmable circuit modules 306 can perform signal processing on waves of energy at the artificially-structured material 300. For example, the programmable circuit modules 306 can amplify signals in the waves of energy at the artificially-structured material 300. The programmable circuit modules 306 can perform signal processing on waves of energy at the artificially-structured material 300 on a per-element basis at the elements 302 of the artificially-structured material 300. For example, the first programmable circuit module 306-1 can perform signal processing at the first element 302-1 to a wave of energy that is or will be processed at the first element 302-1. In performing signal processing on waves of energy at the artificially-structured material 300, the programmable circuit modules 306 can perform non-linear signal processing on the waves of energy. For example, the programmable circuit modules 306 can perform non-linear filtering on waves of energy processed at the artificially-structured material 300.

The programmable circuit modules 306 can perform signal processing on waves of energy at the artificially-structured material 300 based on either or both stimuli detected by sensors and outside input. For example, if outside input indicates to filter a specific signal, then the programmable circuit modules 306 can filter the specific signal at the artificially-structured material 300. In another example, if a sensor detects an amplitude of a wave of energy is below a threshold amount, then the programmable circuit modules 306 can amplify the wave of energy at the artificially-structured material 300.

The artificially-structured material 300 can include data storage circuitry. The data storage circuitry can be included as part of an array of data storage circuitry. Additionally, the data storage circuitry can be included as part of the elements 302.

Data storage circuitry included as part of the artificially-structured material 300 can store data associated with one or more sensors, e.g. sensors included as part of the artificially-structured material 300 such as the sensors 106 described in the example artificially-structured material 100 shown in FIG. 1. For example, the data storage circuitry can store sensor input indicating detected stimuli. More specifically, the data storage circuitry included as part of the artificially-structured material 300 can store sensor input received from a sensor integrated as part of the artificially-structured material 300 through an interconnect connecting the elements 302 to the sensor.

Additionally, data storage circuitry included as part of the artificially-structured material 300 can store programming instructions for controlling the tuning mechanisms 304, e.g. using the programmable circuit modules 306. Programming instructions stored in the data storage circuitry can be read-only instructions that do not change. Further, programming instructions stored in the data storage circuitry can be read/write instructions that are capable being written to or otherwise changed. More specifically, programming instructions stored in the data storage circuitry can change in response to one or a combination of received sensor input, receive external/outside input, and input received from the elements 302 in the artificially-structured material 300. For example, the programming instructions can change in response to changes made by the elements 302 to propagation directions of waves of energy, as indicated by input received from the elements 302.

Figure 4:
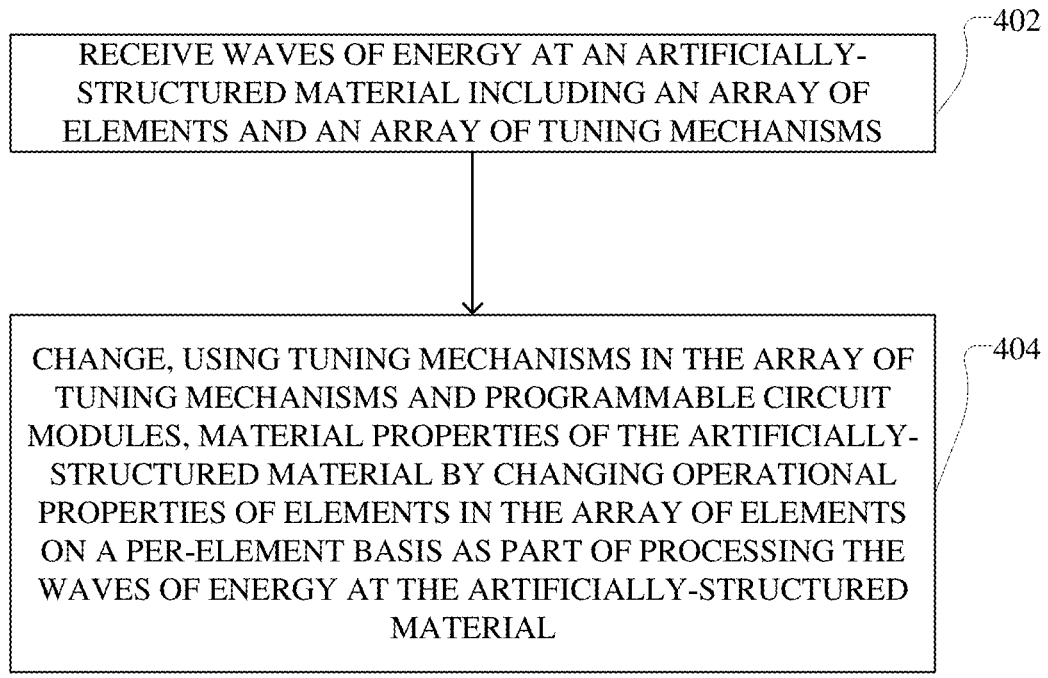
FIG. 4 is a flowchart of an example method of changing material properties of an artificially-structured material on a per-element basis using programmable circuit modules.

FIG. 4 is a flowchart 400 of an example method of changing material properties of an artificially-structured material on a per-element basis using programmable circuit modules. At step 402, waves of energy are received at an artificially-structured material including an array of elements and an array of tuning mechanisms. The tuning mechanisms can be applicable tuning mechanisms for controlling operational properties of the elements on a per-element basis, such as the tuning mechanisms 304. The tuning mechanisms can be integrated as part of the array of elements. Additionally, each tuning mechanism of the tuning mechanisms can be formed as part of a single element in the array of elements and uniquely correspond to the element in which it is integrated, thereby potentially allowing for per-element control of the array of elements.

At step 404, material properties of the artificially-structured material are changed using tuning mechanisms in the array of tuning mechanisms and programmable circuit modules. More specifically, the material properties are changed by changing operational properties of the elements in the array of elements in the array of elements on a per-element basis as part of processing the waves of energy at the artificially-structured material. The programmable circuit modules can be applicable programmable circuit modules for changing operational properties of the elements on a per-element basis, such as the programmable circuit modules 306. The programmable circuit modules can be included as part of the array of elements and or the array of tuning mechanisms. Additionally, each programmable circuit module can be formed as part of a single element in the array of elements and uniquely correspond to the element in which it is integrated, thereby potentially allowing for per-element control of the array of elements.

Figure 5:
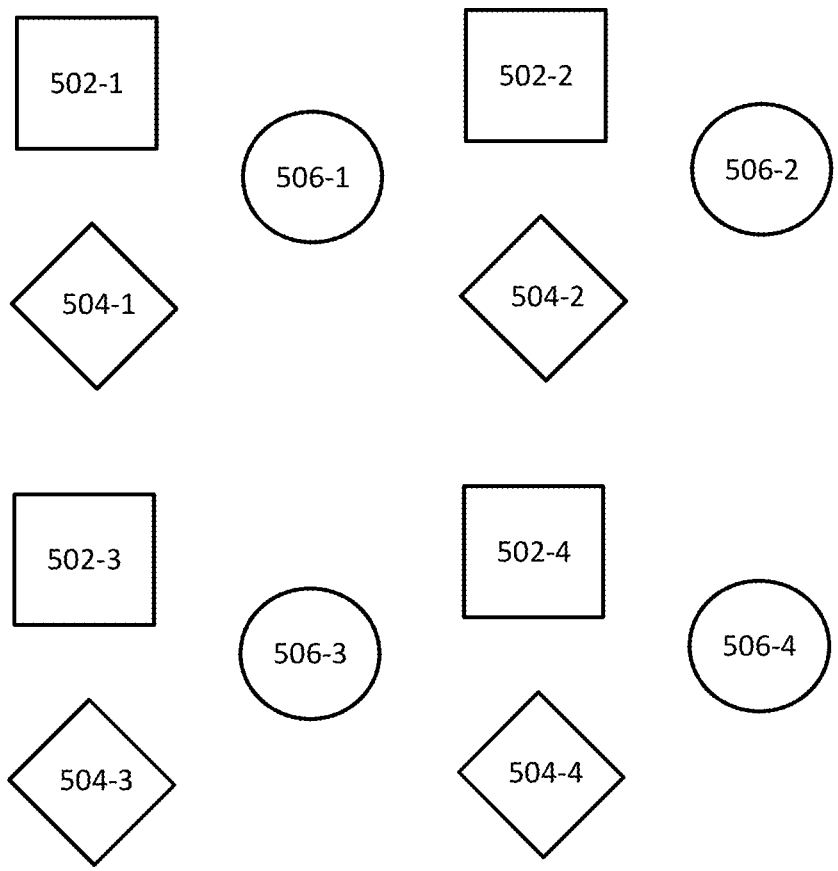
FIG. 5 illustrates an example artificially-structured material with individual data stores.

FIG. 5 illustrates an example artificially-structured material 500 with individual data stores. The artificially-structured material 500 includes a first element 502-1, a second element 502-2, a third element 502-3, and a fourth element 502-4 (herein referred to as "elements 502"). The elements 502 can form an array of elements as part of the artificially-structured material 500. While the example artificially-structured material 500 shown in FIG. 5 is illustrated to include four elements 302, in certain embodiments, the artificially-structured material 500 can include fewer than four elements or more than four elements. For example, the artificially-structured material 500 can include more than four elements that operate together as part of a metamaterial-based device.

The example artificially-structured material 500 shown in FIG. 5 includes a first tuning mechanism 504-1, a second tuning mechanism 504-2, a third tuning mechanism 504-3, and a fourth tuning mechanism 504-4 (herein referred to as "tuning mechanisms 504"). The tuning mechanisms 504 can form an array or a plurality of tuning mechanisms as part of the artificially-structured material 500. While the example artificially-structured material 500 shown in FIG. 5 is illustrated to include four tuning mechanisms 504, in certain embodiments, the artificially-structured material 500 can include fewer than four tuning mechanisms or more than four tuning mechanisms. For example, the artificially-structured material 500 can include more than four tuning mechanisms that operate together as part of electromagnetic energy transmitters.

The tuning mechanisms 504 can each correspond to one or more elements in the artificially-structured material 500. For example, the first tuning mechanism 504-1 can uniquely correspond to, e.g. only control operational properties of, the first element 502-1. In another example, the first tuning mechanism 504-1 can uniquely correspond to, e.g. only control operational properties of, the first element 502-1 and the second element 502-2. While the tuning mechanisms 504 are shown to be separate from the elements 502, the tuning mechanisms 504 can be included as part of the elements 502. For example, as the elements 502 are fabricated, the tuning mechanisms 504 can be fabricated along with the elements 502 as part of the elements 502.

Further, the tuning mechanisms 504 can function according to applicable tuning mechanisms for changing material properties of the artificially-structured material 500, such as the tuning mechanisms 104 shown in FIG. 1. More specifically, the tuning mechanisms 504 can change material properties of the artificially-structured material 500 by changing operational properties of the elements 502 on a per-element basis. For example, the tuning mechanisms 504 can change operational properties of the elements 502 on a per-element basis by changing resonant frequencies of the elements 502 on a per-element basis. In various embodiments, the tuning mechanisms 504 can change operational properties of the elements 502 on a per-element basis according to stimuli detected by applicable sensors, such as the sensors 106 shown in FIG. 1.

The example artificially-structured material 500 includes a first individual data store 506-1, a second individual data store 506-2, a third individual data store 506-3, and a fourth individual data store 506-4 (herein referred to as "individual data stores 506"). The individual data stores 506 can be fabricated from data storage circuitry and form an array or a plurality of individual data stores 506 as part of the artificially-structured material 500. While the example artificially-structured material 500 shown in FIG. 5 is illustrated to include four individual data stores 506, in certain embodiments, the artificially-structured material 500 can include fewer than four individual data stores or more than four individual data stores. For example, the artificially-structured material 500 can include more than four individual data stores that operate together as a transformation optics device.

The individual data stores 506 can each correspond to one or more elements in the artificially-structured material 500. For example, the first individual data store 506-1 can uniquely correspond to, e.g. be used to control operation of, the first element 502-1. In another example, the first individual data store 506-1 can uniquely correspond to, e.g. be used to control operation of, the first element 502-1 and the second element 502-2. While the individual data stores 506 are shown to be separate from the elements 502, the individual data stores 506 can be included as part of the elements 502 and/or the tuning mechanisms 504. For example, as the elements 502 are fabricated, the individual data stores 506 can be fabricated in data storage circuitry along with the elements 502 as part of the elements 502. In various embodiments, each element in the artificially-structured material 500 can have a uniquely corresponding individual data store. For example, each element in the artificially-structured material 500 can have a corresponding individual data store formed as part of the element.

The individual data stores 506 can store data associated with one or more sensors, e.g. sensors included as part of the artificially-structured material 500 such as the sensors 106 described in the example artificially-structured material 100 shown in FIG. 1. For example, the individual data stores can store sensor input indicating detected stimuli. More specifically, the individual data stores 506 can store sensor input received from a sensor integrated as part of the artificially-structured material 500 through an interconnect connecting the elements 502 to the sensor.

Additionally, the individual data stores 506 included as part of the artificially-structured material 500 can store programming/control instructions for controlling the tuning mechanisms 504 and elements 502. Programming instructions stored in the individual data stores 506 can be read-only instructions that do not change. Further, programming instructions stored in the individual data stores 506 can be read/write instructions that are capable being written to or otherwise changed. More specifically, programming instructions stored in the individual data stores 506 can change in response to one or a combination of received sensor input, receive external/outside input, and input received from the elements 502 in the artificially-structured material 500. For example, the programming instructions can change in response to changes made by the elements 502 to local intensities of waves of energy, as indicated by input received from the elements 502.

The tuning mechanisms 504 can change operational properties of the elements 502 on a per-element basis using data stored in the individual data stores 506. Specifically, the tuning mechanisms 504 can change operational properties of the elements 502 on a per-element basis using data stored in the individual data stores 506 and received outside input. Additionally, the tuning mechanisms 504 can change operational properties of the elements 502 on a per-element basis using data stored in the individual data stores 506 and stimuli detected by sensors. For example, the tuning mechanisms 504 can control operational properties of the elements 502 based on characteristics of waves of energy processed by the artificially-structured material 500 and control instructions for processing the waves of energy, as indicated by data stored in the individual data stores 506. Sensors used in controlling the tuning mechanisms 504 along with data stored in the individual data stores 506 can be applicable sensors for detecting stimuli at the artificially-structured material 500, such as the sensors 106 in the example artificially-structured material 100 shown in FIG. 1. For example, sensors can be implemented at each of the elements 502 and used by the tuning mechanisms 504, along with data stored in the individual data stores 506, to control operational properties of the elements 502.

The elements 502 can determine, on a per-element basis, whether to process a specific wave of energy at the artificially-structured material 500 using data stored in the individual data stores 506. For example, a specific element of the elements 502 can determine whether to process a wave of energy at the specific element using data stored in one or more of the individual data stores 506. The elements 502 can determine whether to process a wave of energy on a per-element basis at the artificially-structured material 500 based on data stored in the individual data stores 506 and characteristics of the wave of energy. For example, the first element 502-1 can determine by itself whether to process a wave of energy based on a wavelength of the wave and control instructions for processing waves as indicated by data stored in the first individual data store 502-6.

Further, the elements 502 can process a specific wave of energy based on a determination, made on a per-element basis, to process the specific wave of energy and data stored in the individual data stores 506. More specifically, the elements 502 can configure their corresponding operational properties, on a per-element basis, to process the specific wave of energy if they determine to process the specific wave of energy. Subsequently, the elements 502 can process the specific wave after or during configuration of their operational properties to process the specific wave of energy. The elements 502 can determine how to configure their operational parameters for purposes of processing the specific wave using data stored in the individual data stores 506. More specifically, the elements 502 can determine how to configure their operational parameters in order to process the specific wave of energy based on characteristics of the wave of energy and data stored in the individual data stores 506.

The elements 502 can determine whether and how to process a specific wave of energy, on a per-element basis, based on either or both stimuli detected by sensors and outside input, as included as part of data stored in the individual data stores 506. For example, the elements 502 can determine, on a per-element basis, to process a specific wave of energy if outside input included as part of data stored in the individual data stores 506 instructs the elements 502 to process the specific wave of energy. In another example, the elements 502 can determine, on a per-element basis, how to configure their operational properties based on a propagation direction of a specific wave of energy detected by a sensor, as indicated by data stored in the individual data stores 506.

Further, the elements 502 can perform signal processing on waves of energy at the artificially-structured material 500 using data stored in the individual data stores 506. For example, the elements 502 can amplify signals in the waves of energy at the artificially-structured material 500 based on control instructions included as part of data stored in the individual data stores 506. The elements 502 can perform signal processing on waves of energy at the artificially-structured material 500 on a per-element basis using data stored in the individual data stores 506. For example, the first element 502-1 can perform signal processing to a wave of energy that is or will be processed at the first element 502-1 according to control instructions stored in the individual data store 506-1. In performing signal processing on waves of energy at the artificially-structured material 500, the elements 502 can perform non-linear signal processing on the waves of energy according to data stored in the individual data stores 506. For example, the elements 502 can perform non-linear filtering on waves of energy according to control instructions stored in the individual data stores 506.

The elements 502 can perform signal processing on waves of energy at the artificially-structured material 500 based on either or both stimuli detected by sensors and outside input, as indicated by data stored in the individual data stores 506. For example, if outside input, included as part of data stored in the individual data stores 506, indicates to filter a specific signal, then the elements 502 can filter the specific signal corresponding to a specific wave of energy at the artificially-structured material 500. In another example, if a sensor detects an amplitude of a wave of energy is below a threshold amount, as indicated by data stored in the individual data stores 506, then the elements 502 can amplify the wave of energy at the artificially-structured material 500.

The artificially-structured material 500 can include programmable circuitry/programmable circuitry modules. The programmable circuitry modules can function according to an applicable programmable circuitry module for controlling tuning mechanisms/elements in an artificially-structured material, such as the programmable circuit modules 306 in the example artificially-structured material 300 shown in FIG. 3. The programmable circuitry can be included as part of an array of programmable circuitry modules, e.g. formed as part of the array of elements 502.

Figure 6:
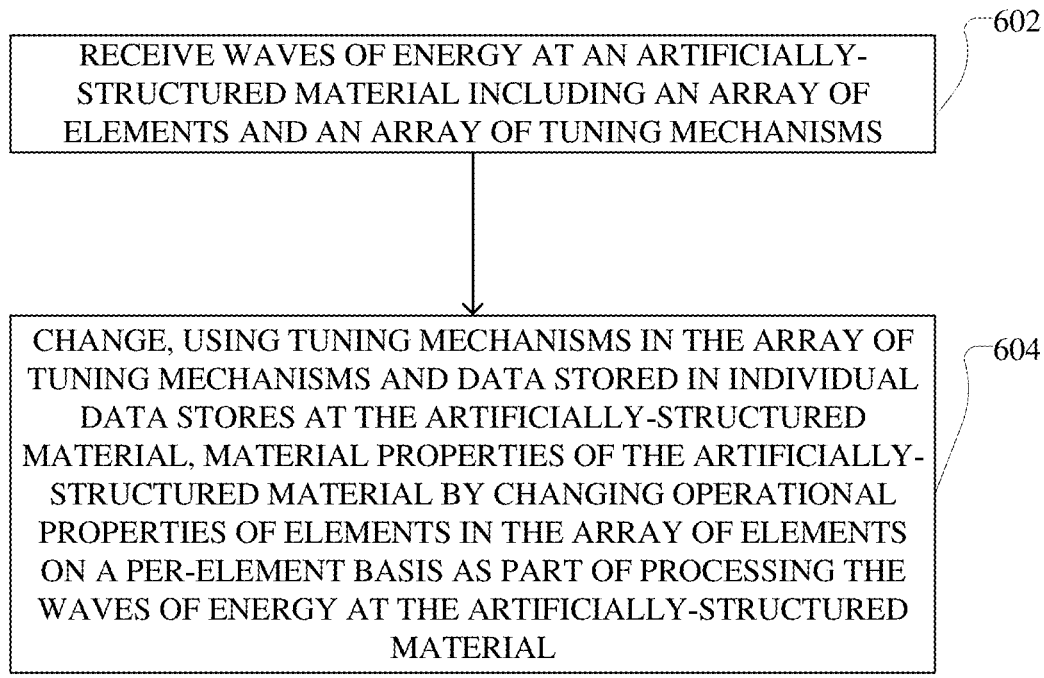
FIG. 6 is a flowchart of an example method of changing material properties of an artificially-structured material on a per-element basis using data stored in individual data stores at the artificially-structured material.

FIG. 6 is a flowchart 600 of an example method of changing material properties of an artificially-structured material on a per-element basis using data stored in individual data stores at the artificially-structured material. At step 602, waves of energy are received at an artificially-structured material including an array of elements and an array of tuning mechanisms. The tuning mechanisms can be applicable tuning mechanisms for controlling operational properties of the elements on a per-element basis, such as the tuning mechanisms 504. The tuning mechanisms can be integrated as part of the array of elements. Additionally, each tuning mechanism of the tuning mechanisms can be formed as part of a single element in the array of elements and uniquely correspond to the element in which it is integrated, thereby potentially allowing for per-element control of the array of elements.

At step 604, material properties of the artificially-structured material are changed using tuning mechanisms in the array of tuning mechanisms and data stored in individual data stores at the artificially-structured material. More specifically, the material properties are changed by changing operational properties of the elements in the array of elements in the array of elements on a per-element basis using the data stored in the individual data stores as part of processing the waves of energy at the artificially-structured material. The individual data stores can be applicable data stores for storing data used in changing operational properties of the elements on a per-element basis, such as the individual data stores 506. The individual data stores can be included as part of the array of elements. Additionally, each individual data store can be formed as part of a single element in the array of elements and uniquely correspond to the element in which it is integrated, thereby potentially allowing for per-element control of the array of elements.

Figure 7:
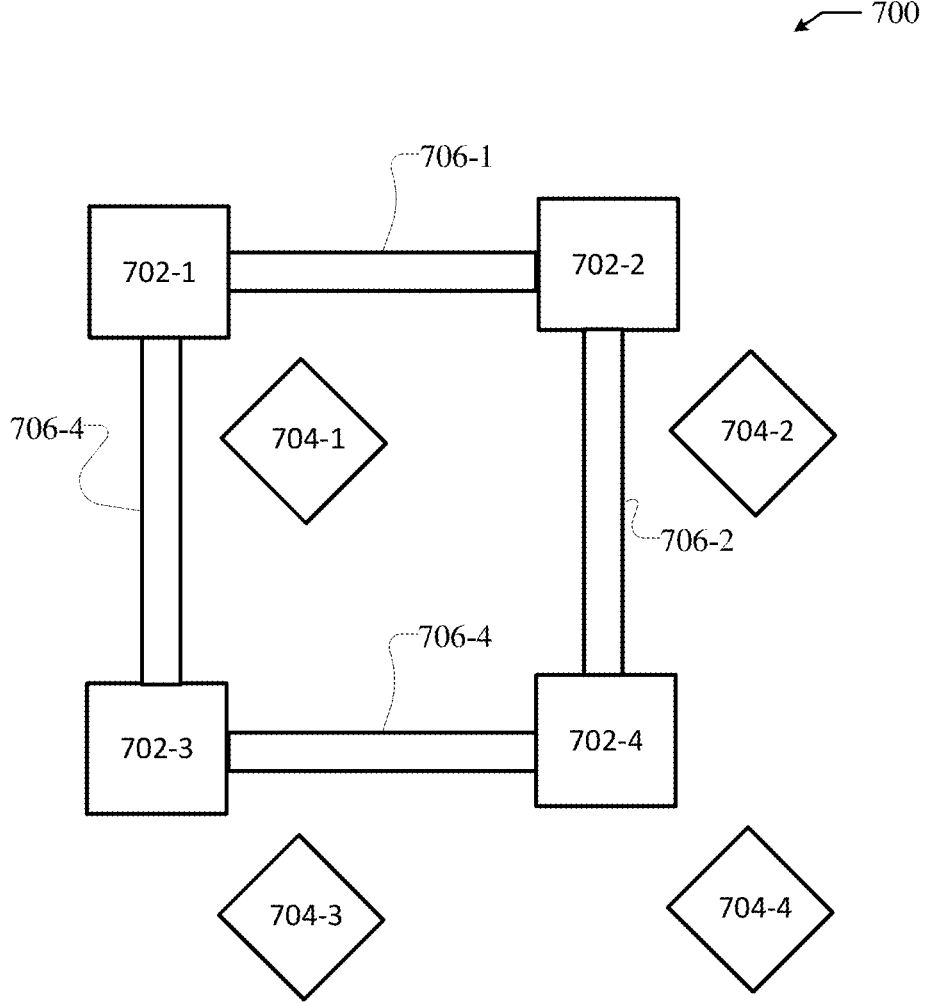
FIG. 7 illustrates an example artificially-structured material with interconnects.

FIG. 7 illustrates an example artificially-structured material 700 with interconnects. The artificially-structured material 700 includes a first element 702-1, a second element 702-2, a third element 702-3, and a fourth element 702-4 (herein referred to as "elements 702"). The elements 702 can form an array of elements as part of the artificially-structured material 700. While the example artificially-structured material 700 shown in FIG. 7 is illustrated to include four elements 702, in certain embodiments, the artificially-structured material 700 can include fewer than four elements or more than four elements. For example, the artificially-structured material 700 can include more than four elements that operate together as part of a transformation acoustic device.

The example artificially-structured material 700 shown in FIG. 7 includes a first tuning mechanism 704-1, a second tuning mechanism 704-2, a third tuning mechanism 704-3, and a fourth tuning mechanism 704-4 (herein referred to as "tuning mechanisms 704"). The tuning mechanisms 704 can form an array or a plurality of tuning mechanisms as part of the artificially-structured material 700. While the example artificially-structured material 700 shown in FIG. 7 is illustrated to include four tuning mechanisms 704, in certain embodiments, the artificially-structured material 700 can include fewer than four tuning mechanisms or more than four tuning mechanisms. For example, the artificially-structured material 700 can include more than four tuning mechanisms that operate together as part of electromagnetic energy transmitters.

The tuning mechanisms 704 can each correspond to one or more elements in the artificially-structured material 700. For example, the first tuning mechanism 704-1 can uniquely correspond to, e.g. only control operational properties of, the first element 702-1. In another example, the first tuning mechanism 704-1 can uniquely correspond to, e.g. only control operational properties of, the first element 702-1 and the second element 702-2. While the tuning mechanisms 704 are shown to be separate from the elements 702, the tuning mechanisms 704 can be included as part of the elements 702. For example, as the elements 702 are fabricated, the tuning mechanisms 704 can be fabricated along with the elements 702 as part of the elements 702.

Further, the tuning mechanisms 704 can function according to applicable tuning mechanisms for changing material properties of the artificially-structured material 700, such as the tuning mechanisms 104 shown in FIG. 1. More specifically, the tuning mechanisms 704 can change material properties of the artificially-structured material 700 by changing operational properties of the elements 702 on a per-element basis. For example, the tuning mechanisms 704 can change operational properties of the elements 702 on a per-element basis by changing resonant frequencies of the elements 702 on a per-element basis. In various embodiments, the tuning mechanisms 704 can change operational properties of the elements 702 on a per-element basis according to stimuli detected by applicable sensors, such as the sensors 106 shown in FIG. 1.

The example artificially-structured material 700 includes a first interconnect 706-1, a second interconnect 706-2, a third interconnect 706-3, and a fourth interconnect 706-4 (herein referred to as "interconnects 706"). The interconnects 706 can function to couple one or a combination of either or both the elements 702 and the tuning mechanisms 704 together. The interconnects 706 can connect one or a plurality of either or both the elements 702 and the tuning mechanisms 704 together. For example the first interconnect 706-1 can connect the first and second elements 702-1 and 702-2 together.

The interconnects 706 can each correspond to one or more elements in the artificially-structured material 700. For example, the first interconnect 706-1 can uniquely correspond to the first element 702-1. In another example, the first interconnect 706-1 can uniquely correspond to the first element 702-1 and the second element 702-2. While the interconnects 706 are shown to be separate from the elements 702, the interconnects 706 can be included as part of the elements 702 and/or the tuning mechanisms 704. For example, as the elements 702 are fabricated, the interconnects 706 can be fabricated along with the elements 702, potentially as part of the elements 702. In various embodiments, each element in the artificially-structured material 700 can have a uniquely corresponding interconnect. For example, each element in the artificially-structured material 700 can have a corresponding individual interconnect formed as part of the element.

The interconnects 706 can be configured to transmit communications between either or both the elements 702 and the tuning mechanisms 704. For example, the first interconnect 706-1 can transmit communications between the first element 702-1 and the second elements 702-2. Communications transmitted by the interconnects 706 can include operational instructions for controlling operation of either or both the elements 702 and the tuning mechanisms 704. The interconnects 706 can be electrical conductors configured to transmit communications between the elements 702. Further, the interconnects 706 can be waveguides configured to transmit communications between either or both the elements 702 and the tuning mechanisms 704. While the interconnects 706 are shown to couple the elements 702 together in the example artificially-structured material 700 shown in FIG. 7, the interconnects 706 can also couple the tuning mechanisms 704 together.

The tuning mechanisms 704 can change operational properties of the elements 702 on a per-element basis using communications received through the interconnects 706 at either or both the elements 702 and the tuning mechanisms 704. Specifically, the tuning mechanisms 704 can change operational properties of the elements 702 on a per-element basis using data stored in the individual data stores 506 and received outside input. Additionally, the tuning mechanisms 704 can change operational properties of the elements 702 on a per-element basis using stimuli detected by sensors as communicated by the interconnects 706 as part of sensor input. For example, the tuning mechanisms 704 can control operational properties of the elements 702 based on characteristics of waves of energy processed by the artificially-structured material 700 and control instructions for processing the waves of energy, as indicated by data received through the interconnects 706. Sensors used in controlling the tuning mechanisms 704 can be applicable sensors for detecting stimuli at the artificially-structured material 700, such as the sensors 106 in the example artificially-structured material 100 shown in FIG. 1. For example, sensors can be implemented at each of the elements 702 and/or the interconnects 706 and used by the tuning mechanisms 704 along with communications received through the interconnects 706 to control operational properties of the elements 702.

The elements 702 can determine, on a per-element basis, whether to process a specific wave of energy at the artificially-structured material 700 based on communications transmitted by the interconnects 706. For example, a specific element of the elements 702 can determine whether to process a wave of energy at the specific element based on communications transmitted to and from the specific element through the interconnects 706. The elements 702 can determine whether to process a wave of energy on a per-element basis at the artificially-structured material 700 based on communications transmitted through the interconnects 706 and characteristics of the wave of energy. For example, the first element 702-1 can determine by itself whether to process a wave of energy based on a wavelength of the wave and control instructions for processing waves transmitted to the first element 702-1 through the first interconnect 706-1.

Further, the elements 702 can process a specific wave of energy based on a determination, made on a per-element basis, to process the specific wave of energy and communications transmitted to the elements 702 through the interconnects 706. More specifically, the elements 702 can configure their corresponding operational properties, on a per-element basis, to process the specific wave of energy if they determine to process the specific wave of energy. Subsequently, the elements 702 can process the specific wave after or during configuration of their operational properties to process the specific wave of energy. The elements 702 can determine how to configure their operational parameters for purposes of processing the specific wave based on communications transmitted to and from the elements by the interconnects 706. More specifically, the elements 702 can determine how to configure their operational parameters in order to process the specific wave of energy based on characteristics of the wave of energy and control instructions transmitted to the elements through the interconnects 706.

The elements 702 can determine whether and how to process a specific wave of energy, on a per-element basis, based on either or both stimuli detected by sensors, potentially included as part of the interconnects 706 and outside input transmitted to the elements 702, potentially through the interconnects 706. For example, the elements 702 can determine, on a per-element basis, to process a specific wave of energy if outside input transmitted through the interconnects 706 instructs the elements 702 to process the specific wave of energy. In another example, the elements 702 can determine, on a per-element basis, how to configure their operational properties based on a propagation direction of a specific wave of energy detected by a sensor, as indicated by communications transmitted to the elements 702 through the interconnects.

Additionally, the elements 702 can perform signal processing on waves of energy at the artificially-structured material 500 using communications transmitted by the interconnects 706. For example, the elements 702 can amplify signals in the waves of energy at the artificially-structured material 700 based on control instructions transmitted through the interconnects 706. The elements 702 can perform signal processing on waves of energy at the artificially-structured material 700 on a per-element basis using communications transmitted by the interconnects 706. For example, the first element 702-1 can perform signal processing to a wave of energy that is or will be processed at the first element 702-1 according to control instructions received through the first interconnect 706-1. In performing signal processing on waves of energy at the artificially-structured material 700, the elements 702 can perform non-linear signal processing on the waves of energy according to communications transmitted by the interconnects 706. For example, the elements 702 can perform non-linear filtering on waves of energy according to control instructions transmitted through the interconnects 706.

The elements 702 can perform signal processing on waves of energy at the artificially-structured material 700 based on either or both stimuli detected by sensors and outside input, as transmitted by the interconnects 706. For example, if outside input, included as part of data transmitted by the interconnects 706, indicates to filter a specific signal, then the elements 702 can filter the specific signal corresponding to a specific wave of energy at the artificially-structured material 700. In another example, if a sensor detects an amplitude of a wave of energy is below a threshold amount, as indicated by data transmitted through the interconnects 706, then the elements 702 can amplify the wave of energy at the artificially-structured material 700 based on the transmitted data.

The artificially-structured material 700 can include programmable circuitry modules. Further, the interconnects 706 can transmit programming instructions for programming the programmable circuitry modules. For example, the interconnects 706 can transmit control rules, as part of programming instructions, which can subsequently be programmed into the programmable circuitry modules for use in controlling the elements 702 and/or tuning mechanisms 704.

Figure 8:
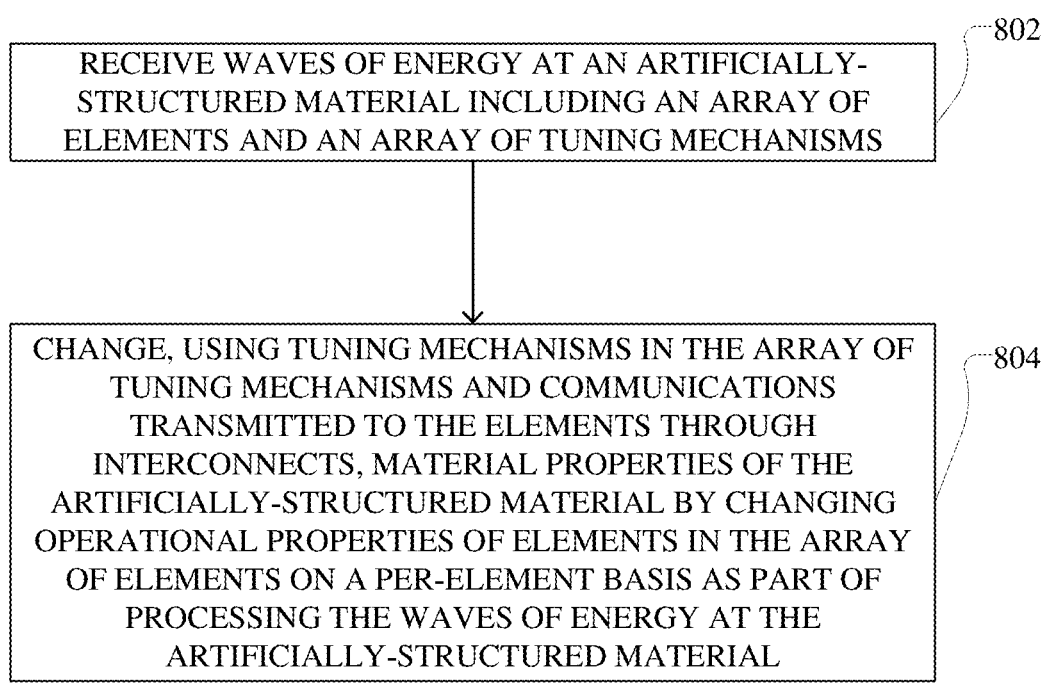
FIG. 8 is a flowchart of an example method of changing material properties of an artificially-structured material on a per-element basis using data stored in individual data stores at the artificially-structured material.

FIG. 8 is a flowchart 800 of an example method of changing material properties of an artificially-structured material on a per-element basis using data stored in individual data stores at the artificially-structured material. At step 802, waves of energy are received at an artificially-structured material including an array of elements and an array of tuning mechanisms. The tuning mechanisms can be applicable tuning mechanisms for controlling operational properties of the elements on a per-element basis, such as the tuning mechanisms 704. The tuning mechanisms can be integrated as part of the array of elements. Additionally, each tuning mechanism of the tuning mechanisms can be formed as part of a single element in the array of elements and uniquely correspond to the element in which it is integrated, thereby potentially allowing for per-element control of the array of elements.

At step 804, material properties of the artificially-structured material are changed using tuning mechanisms in the array of tuning mechanisms and communications transmitted to the elements by interconnects. More specifically, the material properties are changed by changing operational properties of the elements in the array of elements in the array of elements on a per-element basis using the communications transmitted to the elements through the interconnects as part of processing the waves of energy at the artificially-structured material. The interconnects can be applicable interconnects for transmitting communications to the elements, such as the interconnects 706. Each interconnect can uniquely correspond to a single element in the array of elements and be used to transmit communications to and from the single element, thereby potentially allowing for per-element control of the array of elements.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system comprising:
    an array of elements forming an artificially-structured material; and an array of tuning mechanisms included as part of the array of elements, wherein one or more tuning mechanisms of the array of tuning mechanisms are configured to change material properties of the artificially-structured material by changing one or more operational properties of one or more elements of the array of elements on a per-element basis in response to one or more stimuli detected by one or more sensors in a plurality of sensors included in the array of tuning mechanisms.

2. The system of claim 1, wherein each sensor in the plurality of sensors corresponds to one element in the array of elements.

3. The system of claim 1, wherein each tuning mechanism in the array of tuning mechanisms corresponds to one element in the array of elements.

4. The system of claim 1, wherein the one or more tuning mechanisms are configured to change the one or more operational properties of the one or more elements of the array of elements on a per-element basis by changing one or more resonant frequencies of the one or more elements on a per-element basis.

5. The system of claim 4, wherein the one or more tuning mechanisms are configured to change the one or more resonant frequencies of the one or more elements by changing capacitances of the one or more elements.

6. The system of claim 4, wherein the one or more tuning mechanisms are configured to change the one or more resonant frequencies of the one or more elements by changing inductances of the one or more elements.

7. The system of claim 4, wherein the one or more tuning mechanisms are configured to change the one or more resonant frequencies of the one or more elements by changing relative positions between two or more sites within each element of the one or more elements.

8. The system of claim 4, wherein the one or more tuning mechanisms are configured to change the one or more resonant frequencies of the one or more elements by changing relative orientations between two or more sites within each element of the one or more elements.

9. The system of claim 4, wherein the one or more tuning mechanisms are configured to change the one or more resonant frequencies of the one or more elements by changing either or both relative positions and relative orientations between a capacitive component and an inductive component within each element of the one or more elements.

10. The system of claim 4, wherein the one or more tuning mechanisms are configured to change the one or more resonant frequencies of the one or more elements by adding or removing mass from each element of the one or more elements to change an overall mass of the each element of the one or more elements.

11. The system of claim 4, wherein the one or more tuning mechanisms are configured to change the one or more resonant frequencies of the one or more elements by changing one or more physical positions of the one or more elements.

12. The system of claim 11, wherein the one or more tuning mechanisms are configured to change the one or more physical positions of the one or more elements on a micrometer scale.

13. The system of claim 11, wherein the one or more tuning mechanisms are configured to change the one or more physical positions of the one or more elements on a scale smaller than that of a wave of energy for which the element is resonant.

14. The system of claim 11, wherein the one or more tuning mechanisms are configured to change the one or more physical positions of the one or more elements on a scale less than 10% than that of a wave of energy for which the element is resonant.

15. The system of claim 4, wherein the one or more tuning mechanisms are configured to change the one or more operational properties of the one or more elements of the array of the elements on a per-element basis by quenching a wave response of the one or more elements on a per-element basis.

16. The system of claim 1, wherein the one or more tuning mechanisms are configured to change the one or more operational properties of the one or more elements to change one or more characteristics of one or more waves of energy processed by the artificially-structured material.

17. The system of claim 16, wherein the one or more characteristics of the one or more waves of energy changed by changing the one or more operational properties of the one or more elements include wavelengths of the one or more waves of energy.

18. The system of claim 16, wherein the one or more characteristics of the one or more waves of energy changed by changing the one or more operational properties of the one or more elements include either or both phases of the one or more waves of energy and amplitudes of the one or more waves of energy.

19. The system of claim 16, wherein the one or more characteristics of the one or more waves of energy changed by changing the one or more operational properties of the one or more elements include polarizations of the one or more waves of energy.

20. The system of claim 16, wherein the one or more characteristics of the one or more waves of energy changed by changing the one or more operational properties of the one or more elements include propagation directions of the one or more waves of energy.

21. The system of claim 16, wherein the one or more characteristics of the one or more waves of energy changed by changing the one or more operational properties of the one or more elements include absorption characteristics of the one or more waves of energy.

22. The system of claim 16, wherein the one or more waves of energy are selected from the group consisting of electromagnetic waves and acoustic waves.

23. The system of claim 1, wherein the one or more stimuli detected by the one or more sensors include characteristics of one or more waves of energy processed by the artificially-structured material.

24. The system of claim 23, wherein the characteristics of the one or more waves of energy include wavelengths of the one or more waves of energy processed by the artificially-structured material.

25. The system of claim 23, wherein the characteristics of the one or more waves of energy include phases of the one or more waves of energy processed by the artificially-structured material.

26. The system of claim 23, wherein the characteristics of the one or more waves of energy include local intensity of the one or more waves of energy processed by the artificially-structured material.

27. The system of claim 23, wherein the characteristics of the one or more waves of energy include polarization of the one or more waves of energy processed by the artificially-structured material.

28. The system of claim 23, wherein the characteristics of the one or more waves of energy include propagation directions of the one or more waves of energy processed by the artificially-structured material.

29. The system of claim 1, wherein the one or more stimuli detected by the one or more sensors include characteristics of an environment at the array of elements.

30. The system of claim 1, wherein the one or more tuning mechanisms are configured to change the one or more operational properties of the one or more elements of the array of elements in response to received outside input.

31. The system of claim 1, further comprising:
a first element in the array of elements including a first sensor as part of a first tuning mechanism of the array of tuning mechanisms; and
a second element in the array of elements including a second tuning mechanism of the array of tuning mechanisms, wherein the second tuning mechanism is configured to change one or more operational properties of the second element in response to one or more stimuli detected by the first sensor.

32. The system of claim 31, wherein the second tuning mechanism is in operational communication with the first sensor through either or both electronic and optical circuitry.

33. The system of claim 32, wherein either or both of the electronic and optical circuitry is integrated as part of the artificially-structured material.

34. The system of claim 31, wherein the one or more stimuli detected by the first sensor include characteristics of one or more waves of energy processed by the artificially-structured material.

35. The system of claim 1, wherein the artificially-structured material is a metamaterial.

36. The system of claim 1, wherein the one or more elements are further configured to:
determine, on a per-element basis, whether to process a specific wave of energy at the artificially-structured material; and
process the specific wave of energy by changing the one or more operational properties of the one or more elements using the one or more tuning mechanisms if it is determined to process the specific wave of energy.

37. The system of claim 36, wherein the one or more elements are further configured to determine, on a per-element basis, whether to process the specific wave of energy based on characteristics of the specific wave of energy.

38. The system of claim 36, wherein the one or more elements are further configured to process the specific wave of energy based on characteristics of the specific wave of energy.

39. The system of claim 36, wherein the one or more elements are further configured to determine, on a per-element basis, whether to process the specific wave of energy based on the one or more stimuli detected by the one or more sensors.

40. The system of claim 36, wherein the one or more elements are further configured to determine, on a per-element basis, whether to process the specific wave of energy based on received outside input.

41. The system of claim 1, wherein the one or more elements include programmable circuitry integrated as part of the one or more elements and used in controlling the array of tuning mechanisms.

42. The system of claim 1, wherein the one or more elements include data storage circuitry integrated as part of the one or more elements and used in controlling the array of tuning mechanisms.

43. A method comprising:
detecting one or more stimuli by one or more sensors in a plurality of sensors included in an array of elements forming an artificially-structured material, the array of elements including an array of tuning mechanisms; and
changing, using one or more tuning mechanisms in the array of tuning mechanisms, material properties of the artificially-structured material by changing one or more operational properties of one or more elements in the array of elements on a per-element basis in response to the one or more stimuli detected by the one or more sensors.

* * * * *